US007599579B2

(12) United States Patent
Avinash

(10) Patent No.: US 7,599,579 B2
(45) Date of Patent: *Oct. 6, 2009

(54) INTERPOLATED IMAGE FILTERING METHOD AND APPARATUS

(75) Inventor: Gopal B. Avinash, New Berlin, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 926 days.

This patent is subject to a terminal disclaimer.

(21) Appl. No.: 10/193,564

(22) Filed: Jul. 11, 2002

(65) Prior Publication Data

US 2004/0008901 A1 Jan. 15, 2004

(51) Int. Cl.
*G06K 9/32* (2006.01)
(52) U.S. Cl. .................................. 382/298; 382/264
(58) Field of Classification Search ................. 382/261, 382/264, 298, 260, 303, 300; 345/660–671; 348/561, 581, 582, 704; 358/451; 708/208
See application file for complete search history.

(56) References Cited

U.S. PATENT DOCUMENTS

| 4,750,211 | A | * | 6/1988 | Wray | 382/303 |
|---|---|---|---|---|---|
| 5,367,385 | A | * | 11/1994 | Yuan | 358/465 |
| 5,420,637 | A | * | 5/1995 | Zeevi et al. | 375/240.12 |
| 5,463,422 | A | * | 10/1995 | Simpson et al. | 348/390.1 |
| 5,703,965 | A | * | 12/1997 | Fu et al. | 382/232 |
| 5,771,318 | A | * | 6/1998 | Fang et al. | 382/261 |
| 5,892,554 | A | * | 4/1999 | DiCicco et al. | 348/584 |
| 5,963,676 | A | * | 10/1999 | Wu et al. | 382/274 |
| 6,173,083 | B1 | | 1/2001 | Avinash | 382/260 |
| 6,198,844 | B1 | * | 3/2001 | Nomura | 382/168 |
| 6,208,763 | B1 | | 3/2001 | Avinash | 382/254 |
| 6,246,783 | B1 | * | 6/2001 | Avinash | 382/128 |
| 6,389,176 | B1 | * | 5/2002 | Hsu et al. | 382/254 |
| 6,556,720 | B1 | * | 4/2003 | Avinash | 600/447 |
| 6,592,523 | B2 | * | 7/2003 | Avinash et al. | 600/443 |
| 6,603,576 | B1 | * | 8/2003 | Nakamura et al. | 358/3.28 |
| 6,823,086 | B1 | * | 11/2004 | Dolazza | 382/261 |
| 6,914,699 | B1 | * | 7/2005 | Takata et al. | 358/1.9 |
| 6,963,670 | B2 | * | 11/2005 | Avinash et al. | 382/260 |
| 6,973,219 | B2 | * | 12/2005 | Avinash | 382/260 |
| 7,016,549 | B1 | * | 3/2006 | Utagawa | 382/261 |
| 7,023,487 | B1 | * | 4/2006 | Adams | 348/448 |
| 7,072,525 | B1 | * | 7/2006 | Covell | 382/261 |
| 7,206,101 | B2 | * | 4/2007 | Avinash | 358/3.26 |
| 2003/0095714 | A1 | * | 5/2003 | Avinash | 382/260 |
| 2003/0097069 | A1 | * | 5/2003 | Avinash et al. | 382/260 |
| 2003/0099405 | A1 | * | 5/2003 | Avinash et al. | 382/260 |
| 2004/0005077 | A1 | * | 1/2004 | Bilobrov et al. | 382/100 |
| 2006/0018526 | A1 | * | 1/2006 | Avinash | 382/132 |

* cited by examiner

*Primary Examiner*—Mattew C Bella
*Assistant Examiner*—Dennis Rosario
(74) *Attorney, Agent, or Firm*—Fletcher Yoder

(57) ABSTRACT

A technique for processing a digital image in which an operator selection of a field of view triggers the automatic selection of a shrink factor, so that image processing and quality is uniform regardless of the operator selection. Processing of the image includes shrinking the image by the shrink factor, identifying structural elements within the image, differentially processing the structure and non-structure elements, expanding the image by the shrink factor, and texture blending the processed image with the original image. Optionally, high frequency noise may also be blended with the processed image to improve perceived image quality.

30 Claims, 12 Drawing Sheets

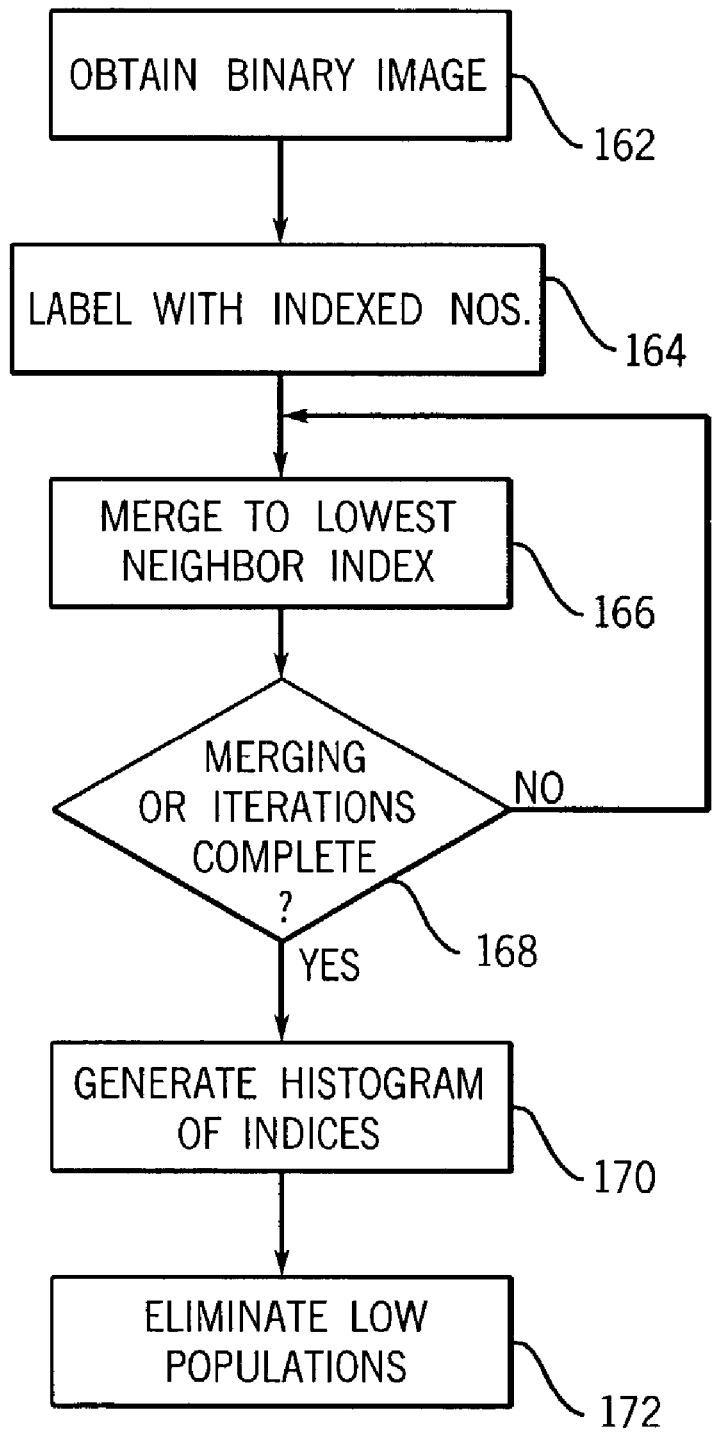

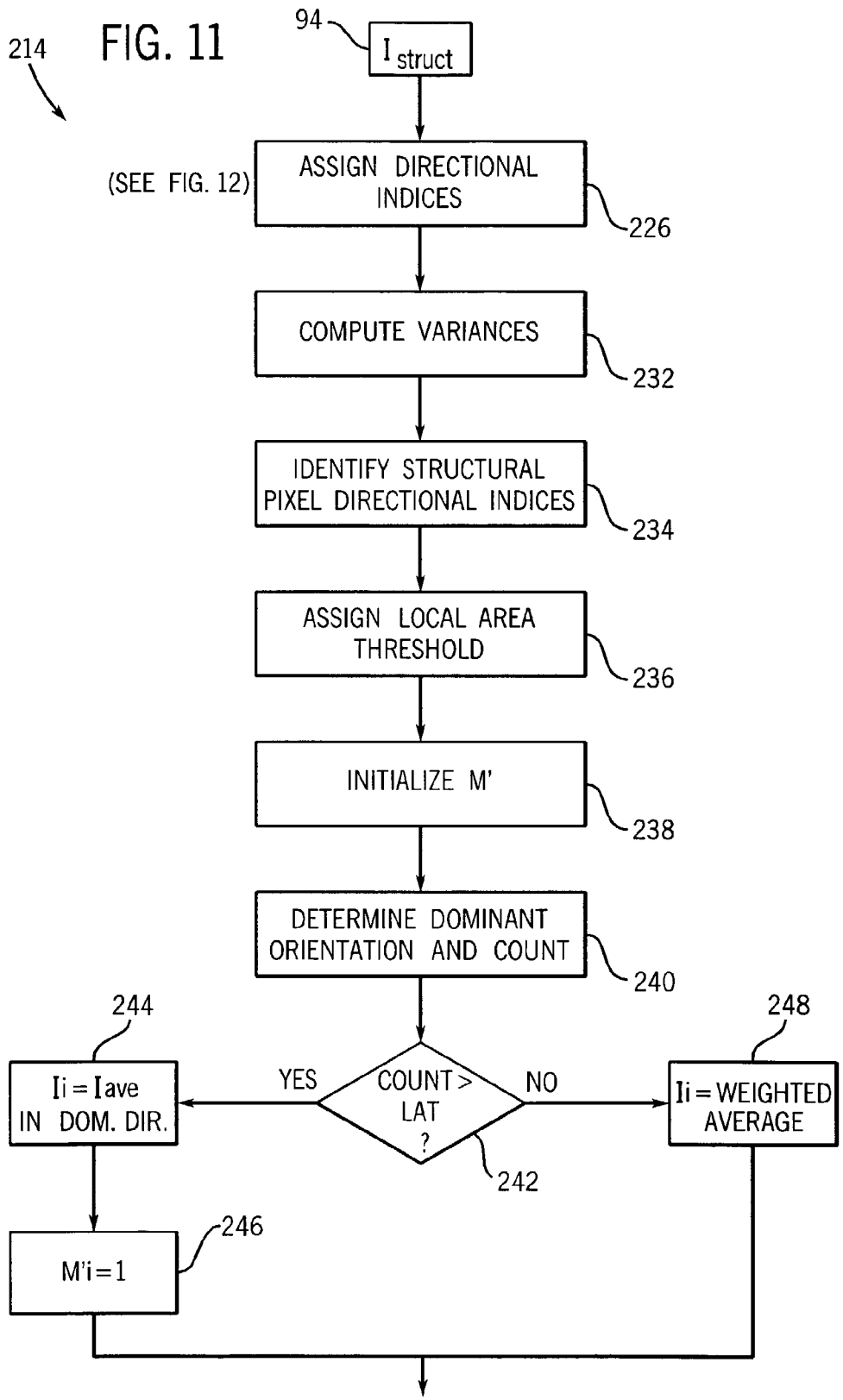

INTERPOLATED IMAGE FILTERING METHOD AND APPARATUS

BACKGROUND OF THE INVENTION

This invention relates to digital imaging techniques. More particularly, the invention relates to an improved image optimization technique for differentially processing pixel values representative of image structure while maintaining overall image quality.

A number of digital imaging techniques are known and presently in use. These range from digital cameras, to sheet or picture scanners, to sophisticated scanners used in fields such as medical diagnostics. Depending upon the system design, digital pixel data is obtained and used to generate useful images.

Magnetic resonance (MR) imaging techniques, for example, subject an object to a uniform magnetic field upon which various gradient fields have been superimposed. The uniform magnetic field homogenizes the spins of responsive material within the object such that the spins are effectively aligned. An excitation if pulse is the applied to "tip" the spins of the responsive material into a plane transverse to the uniform magnetic field. Upon removal of the excitation if pulse, the spins realign with the uniform magnetic field and, in the process, emit a resonance signal. These resonance signals are detected by the imaging system and are processed to produce the magnetic resonance image.

Current MR imaging and certain other systems process the detected resonance signals using reconstruction algorithms with zero-filled interpolation (ZIP) capability, or similar techniques. By using ZIP, the reconstruction algorithms are capable of producing differently sized interpolated images as specified by the operator. However the interpolation changes the image noise characteristics and the extent of point spread, thus affecting image quality.

Typically, image data is filtered to improve image quality and/or enhance selected characteristics. One such type of filtering might differentially enhance specific structures within the image, such as bone, soft tissue, or fluids in the medical diagnostics field, which are relied upon by physicians or radiologists in making their diagnosis. Such structures may be physically defined in the image by contiguous edges, contrast, texture, and so forth. In such structure enhancing filtering, non-structure textural and contrast information must be maintained to allow interpretation of the structures and the surrounding background.

Ideally the filtering technique will perform its functions in a computationally efficient manner, thereby reducing processing time and the associated hardware requirements. However, current image filter frameworks, such as tools used in MR imaging, do not account for the added variability in noise and point spread function due to interpolation and therefore do not optimize either the image quality or the duration of the filtering process. In addition to affecting the image quality and the time associated with the filtering process, resizing the image by interpolation requires tuning filter and display parameters for each new field of view selected. This returning itself takes additional time and creates additional datasets for storage or processing.

There is a need, therefore, for a more computationally efficient technique for enhancing interpolated images which addresses these concerns. Ideally such a technique would be robust in its implementation, allowing it to be used with any number of imaging systems, such as MR or CT imaging systems with few, if any, modifications.

SUMMARY OF THE INVENTION

The invention provides a technique for the processing of digital images. The technique provides a means of automatically assigning a processing parameter, such as a shrink factor, based upon operator selected criteria, such as a field of view. This automation allows the images to be processed uniformly so that variations in the selected field of view will yield images of similar quality. In addition, the process provides an optional process for improving perceived image quality by selectively adding high frequency noise to the processed image.

The technique comprises a shrinking step by which the original image is shrunk and a processing step which identifies structure within the image and selectively enhances that structure in regard to non-structure elements. An expansion step occurs to expand the shrunken image to its original size. In addition, texture from the original image may be blended into the processed image subsequent to the expansion in order to improve perceived image quality.

In accordance with another aspect of the present invention, a method is provided for the processing of a digital image. The method comprises the steps of setting a shrink factor based upon an operator selected field of view and shrinking the digital image by the shrink factor. The shrunken image is processed to selectively enhance one or more selected regions and expanded by the shrink factor to restore the image to its original size. One or more portions of the expanded image is then blended with one or more corresponding portions of the initial digital image.

In accordance with another aspect of the present invention, a method is provided for processing a digital image. The method comprises the steps of automatically specifying a shrink factor based upon a field of view selected by an operator, shrinking the digital image by the shrink factor, and processing the digital image. The processed digital image is subsequently expanded by the shrink factor.

In accordance with another aspect of the present invention, a method is provided for improving the perceived image quality of a digital image. The method comprises accessing a distribution of random noise and weighting a number drawn from the distribution by a factor. The factor is determined based upon a characteristic of a pixel of the digital image. The weighted number is then combined with the pixel.

In accordance with another aspect of the present invention, a system is provided for processing a digital image. The system comprises an input device for controlling and processing input. In addition, the system comprises an output device for producing a reconstructed image based upon the processed image data. The system also comprises a signal processing circuit configured to process the image data. The signal processing circuit receives a selected field of view from an operator via the input device and assigns a shrink factor in response to that field of view. The signal processing circuit shrinks the image by the shrink factor, processes the shrunken image, and expands the processed image by the shrink factor.

In accordance with another aspect of the present invention, a system is provided for processing a digital image. The system comprises a signal processing circuit configured to access a distribution of noise and to acquire a number from the distribution. The signal processing circuit weights the acquired number by a factor which is determined by a characteristic of a pixel of the digital image. The signal processing circuit then combines the weighted number and the pixel.

In accordance with another aspect of the present invention, a system is provided for processing digital images. The system comprises an input circuit capable of receiving signals from one or more input devices. The system also comprises an output circuit capable of receiving signals from a processing circuit. In addition, the system comprises a processing circuit capable of receiving signals from the input circuit and sending signals to the output circuit. The processing circuit comprises a means to shrink a digital image in response to an input provided by an operator by the input circuit. The processing circuit processes the shrunken image, expands the processed image by the same factor by which the image was shrunk, and sends the expanded image to the output circuit.

BRIEF DESCRIPTION OF THE DRAWINGS

The foregoing and other advantages and features of the invention will become apparent upon reading the following detailed description and upon reference to the drawings in which:

FIG. 8 is a flow chart depicting the steps in selectively eliminating small or noisy regions from the structure definition;

FIG. 11 is a flow chart depicting the steps for performing dominant orientation smoothing of image pixels identified as structure;

DETAILED DESCRIPTION OF SPECIFIC EMBODIMENTS

Figure 1:
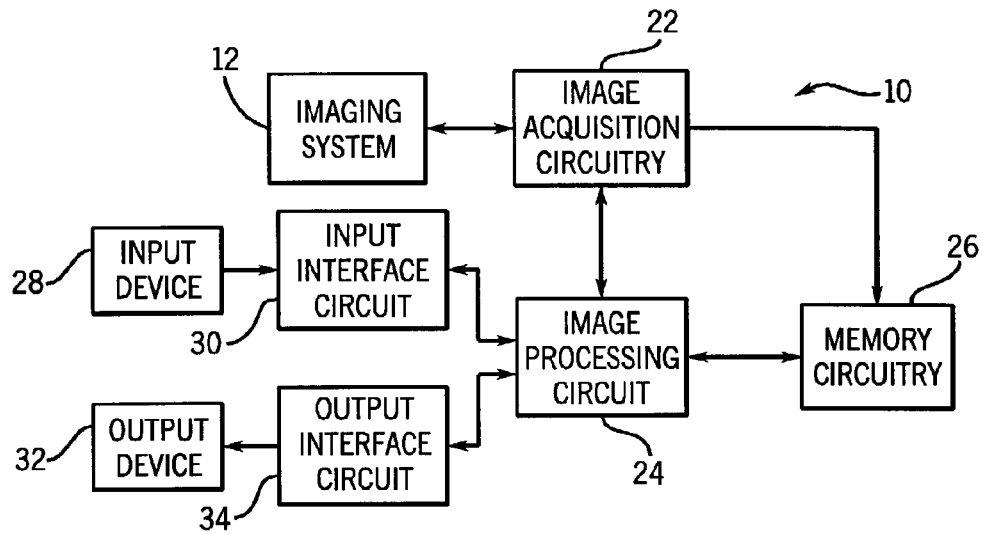
FIG. 1 is a diagrammatical representation of a MR imaging system adapted to enhance discrete pixel regions of an acquired image.

Referring to FIG. 1, a MR image acquisition system 10 is depicted as including a MR scanner 12 coupled to circuitry for acquiring and processing discrete pixel data. Signals sensed by the MR scanner 12 are encoded to provide digital values representative of the signals associated with specific locations on or in the subject, and are transmitted to the image acquisition circuitry 22. the image acquisition circuitry 22 also provides control signals for configuration and coordination of scanner operation during image acquisition. The image acquisition circuitry 22 transmits the encoded image signals to an image processing circuit 24.

The image processing circuit 24 executes pre-established control logic routines stored within a memory circuit 26 to filter and condition the signals received from the image acquisition circuitry 22 to provide digital values representative of each pixel in the acquired image. These values are then stored in the memory circuit 26 for subsequent processing and display. Alternately, the image acquisition circuitry 22 may transmit the encoded image signals to the memory circuit 26. The image processing circuit 24 may subsequently acquire the signals from the memory circuit 26 for the filtering and conditioning steps described above.

The image processing circuit 24 receives configuration and control commands from an input device 28 via an input interface circuit 30. The input device 28 will typically include an operator's station and keyboard for selectively inputting configuration parameters and for commanding specific image acquisition sequences. The image processing circuit 24 is also coupled to an output device 32 via an output interface circuit 34. The output device 32 will typically include a monitor or printer for generating reconstituted images based upon the image enhancement processing carried out by the processing circuit 24.

In the embodiment described, the image processing circuit 24, the memory circuit 26, and the input and output interface circuits 30 and 34 are included in a programmed digital computer. However, circuitry for carrying out the techniques described herein may be configured as appropriate coding in application-specific microprocessors, analog circuitry, or a combination of digital and analog circuitry.

Figure 2:
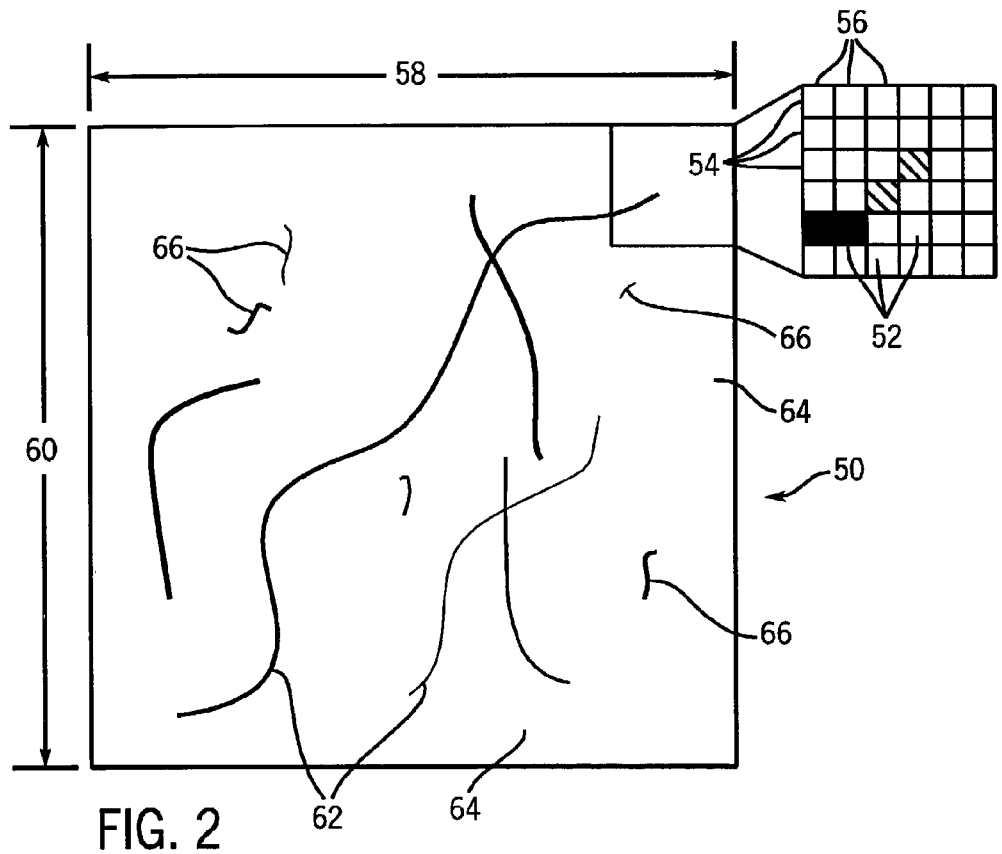
FIG. 2 is a diagram of an exemplary discrete pixel image made up of a matrix of pixels having varying intensities defining structures and non-structures.

FIG. 2 illustrates an exemplary discrete pixel image 50 produced via the image acquisition system 10. The image 50 is composed of a matrix of discrete pixels 52 disposed adjacent to one another in a series of rows 54 and columns 56. These rows and columns of pixels provide a pre-established matrix width 58 and matrix height 60. Typical matrix dimensions may include 256×256 pixels; 512×512 pixels; 1,024× 1,024 pixels, and so forth. The particular image matrix size may be selected via input device 28 (see FIG. 1) and may vary depending upon such factors as the subject to be imaged and the resolution desired.

As illustrated in FIG. 2, the exemplary image 50 includes structural regions 62, illustrated as consisting of long, contiguous lines defined by adjacent pixels. The image 50 also includes non-structural regions 64 lying outside of the structural regions 62. The image 50 may also include isolated artifacts 66 of various sizes (i.e., number of adjacent pixels), which may be defined as structural regions, or which may be eliminated from the definition of structure in accordance with the techniques described below. The structures and features of the exemplary image 50 are also features of the specific and modified images discussed below in relation to FIG. 4 and in accordance with the techniques described below.

It should be noted that while reference is made in the following discussion to intensity values within an image, such as the exemplary image 50, the present technique may also be used to process other parameters encoded for the individual pixels 52 of an image. Such parameters might include frequency or color, not merely intensity.

Figure 3:
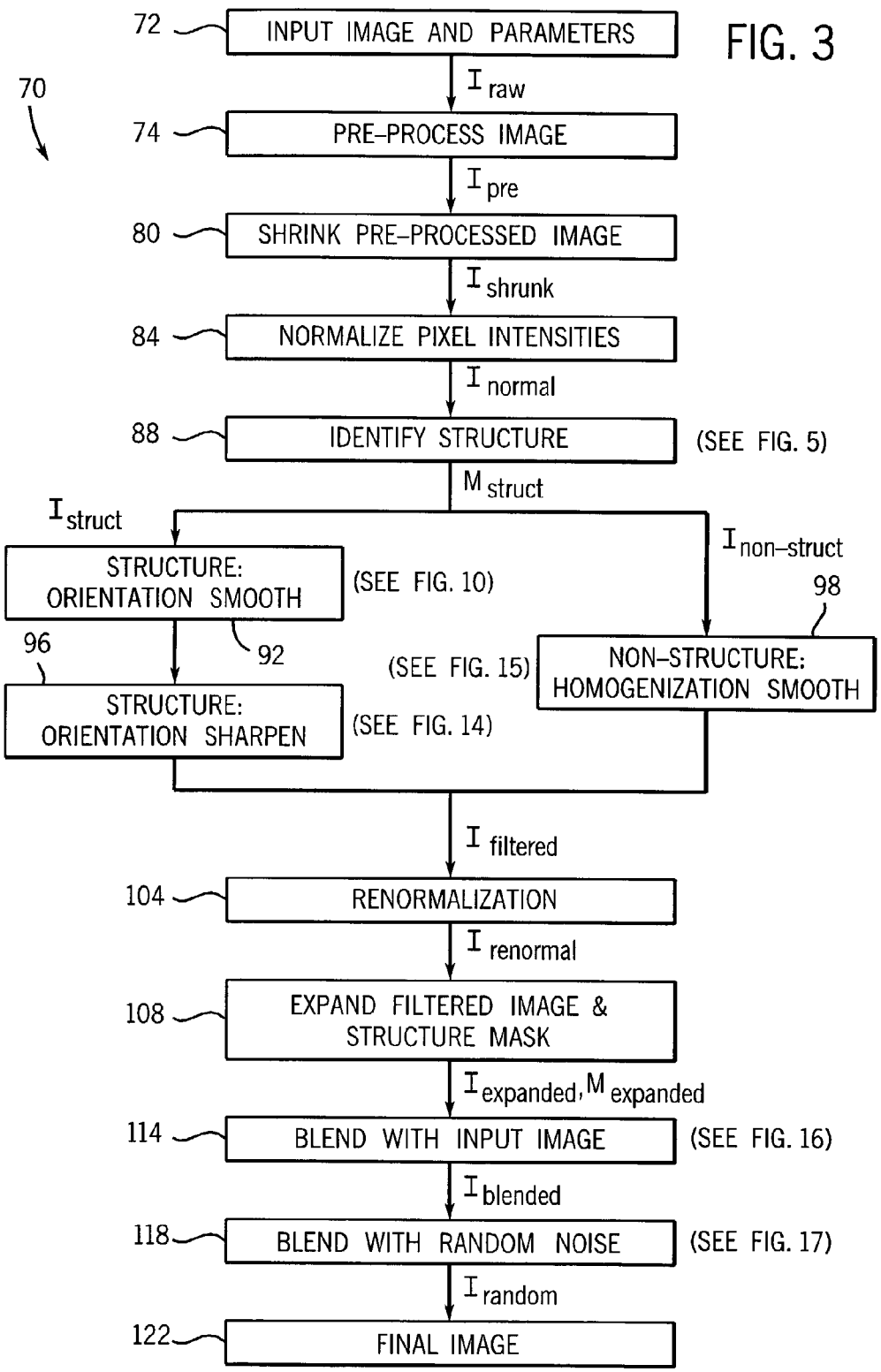
FIG. 3 is a flow chart depicting the steps in processing a digital image to enhance both structural and non-structural regions in the image.
Figure 4:
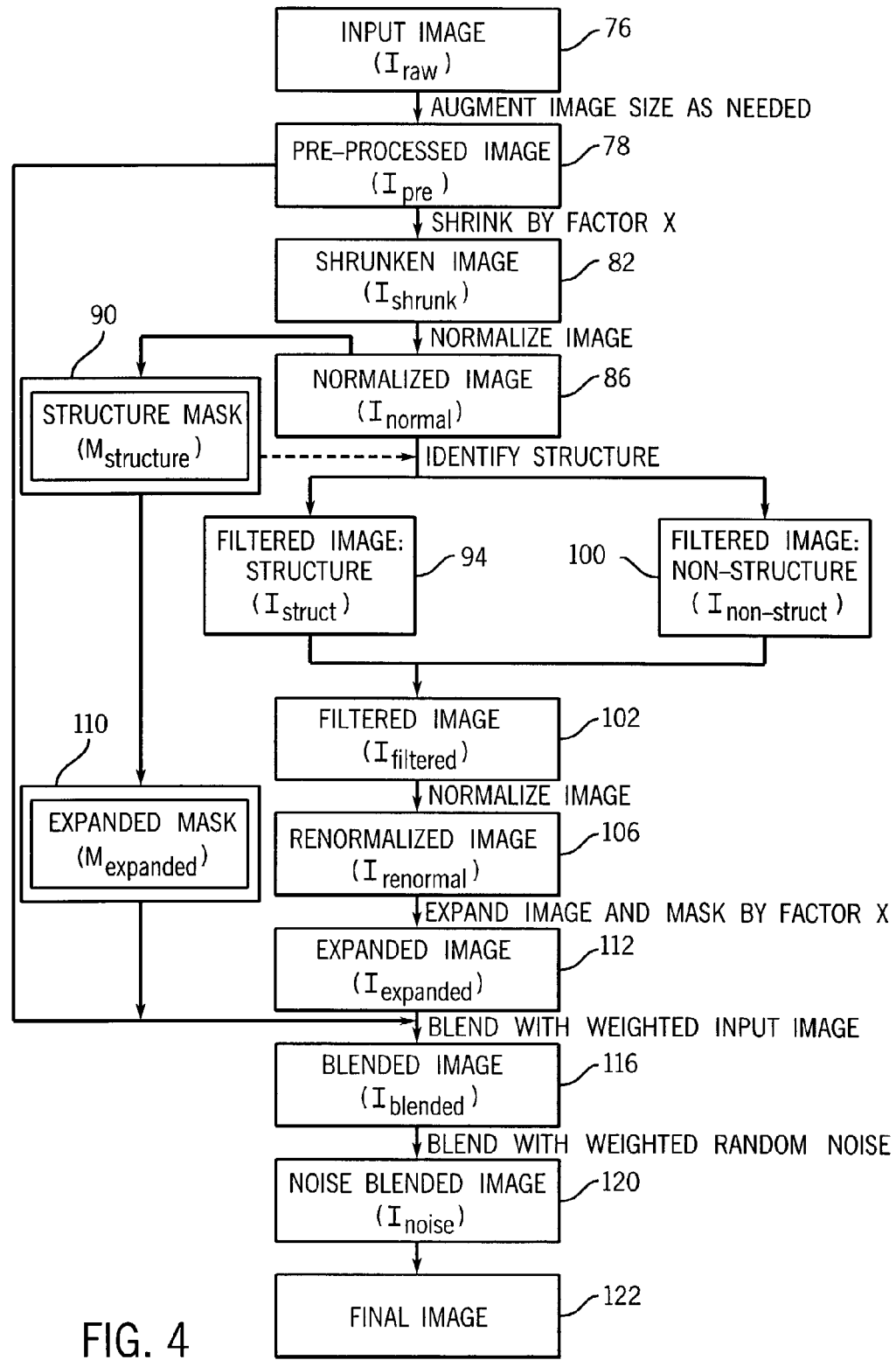
FIG. 4 is a flow chart depicting the progression of an image through enhancement in accordance with the present technique.

Referring now to FIGS. 3 and 4, the present technique is flowcharted, respectively, as both a sequence of processing stages applied to image data and as a progression of modified images resulting from the stages of the present techniques. Referring first to FIG. 3, the structural regions 62 and non-structural regions 64 are identified and enhanced in accordance with summarized control logic. This control logic is preferably implemented by the image processing circuit 24 based upon appropriate programming code stored within the memory circuit 26. The control logic routine, designated generally by reference numeral 70 in FIG. 3, begins with the initialization of parameters, either default or operator selected, employed in the image enhancement process, as depicted at block 72. This initialization step typically includes the amount of shrinking, the interpolation type, and parameters specific to noise reduction, i.e. thresholds related to focus, edge determination, and blending.

Where desired, entry of certain of these parameters may be prompted via the input device 28, requiring the operator to select between several parameter choices, such as the desired field of view of the image. Assignment of certain downstream parameters may then be automated in response to the operator-selected parameters. For example, the parameter associated with the amount of shrinking to be used in processing, i.e. the shrink factor, may be set automatically in response to the operator's selection of a field of view which directly determines the amount of area described by a pixel. For example, in one embodiment, the shrink factor may be set to 1 for images of size 256×256 or smaller, 2 for images larger than 256×256 but less than or equal to 512×512, and 4 for images larger than 512×512.

Automated determination of this shrink factor, or other initialization parameters, in response to operator-selected parameters, allows the production of uniform images that possess the same appearance or quality, even when different fields of view are selected. In this manner, an operator need only select the field of view and the processing circuitry 24 will assign the other appropriate parameters to produce images of uniform quality and appearance. While the assignment of parameters, such as the shrink factor, need not be automated, thereby allowing the operator to assign all image enhancement parameters, it is generally desirable to provide such automation to enhance the uniformity of the filtering process and to minimize the time and effort required of the operator.

Next, as depicted at block 74 in FIG. 3, the image processing circuit 24 preprocesses the input image data 76, represented as $I_{raw}$ (see FIG. 4). Pre-processing of the raw, input image data 76 typically involves augmenting the size of the image to prevent the loss of data during the subsequent shrinking of the image. In particular, the appropriate boundaries of the input image 76 are padded by mirroring the boundary image data in order to allow the subsequent shrink function to process and produce integer values. The result of pre-processing is a pre-processed image 78, represented as $I_{pro-proc}$ in FIG. 4.

As depicted at block 80 in FIG. 3, the pre-processed image 78 is then shrunk by the image processing circuit 24. The shrinking of the pre-processed image 78 may be accomplished by various sub-sampling techniques, including pixel averaging, in which the digital values representative of intensities at each pixel are read and then the image is shrunk by some shrink factor X which is generally greater than one. In the preferred embodiment, a 2×2 or 3×3 boxcar filter may be applied to obtain a non-overlapping average. Multi-dimensional factors may also be employed, such as 2×3 or 3×2 filters. A multi-dimensional factor must be greater than one in at least one of the dimensions, such as 3×1 or 1×3. As noted in regard to the pre-processing technique of block 74, in order to obtain a non-overlapping average, pixels may be mirrored at the boundaries when needed. A shrunken image 82, $I_{shrunk}$, (see FIG. 4), is the product of the sub-sampling technique.

As depicted at block 84 of FIG. 3, the image processing circuit 24 normalizes the image values acquired for the pixels defining the shrunken image 82. In the illustrated embodiment, this step includes reading digital values representative of intensities at each pixel, and scaling these intensities values over a desired dynamic range. For example, the maximum and minimum intensity values in the image may be determined, and used to develop a scaling factor over the full dynamic range of the output device 32. Moreover, a data offset value may be added to or subtracted from each pixel value to correct for intensity shifts in the acquired data. Thus, at block 84, the processing circuit 24 processes the shrunken image 82 to produce a normalized image 86, $I_{normal}$ (see FIG. 4). The normalized image 86 includes pixel values filtered to span a desired portion of a dynamic range, such as 12 bits, independent of variations in the acquisition circuitry or subject.

Next as depicted at block 88 in FIG. 3, the image processing circuit 24 executes a predetermined logic routine for identifying the structure 62 within the normalized image 86, as defined by data representative of the individual pixels of the image. Exemplary steps for identifying the structure in accordance with the present technique are described below with reference to FIG. 5. The structure identified at step 88 is used to generate a structure mask 90, $M_{struct}$ (see FIG. 4). As depicted at block 92 in FIG. 3, the structure mask 90 is used to identify structure which is then orientation smoothed as summarized below with reference to FIGS. 10-13. As discussed below, various techniques may be employed for this orientation smoothing. However in the described embodiment, dominant orientation smoothing may be carried out, which tends to bridge gaps between spans of structure, or local orientation smoothing may be employed to avoid such bridging. Orientation smoothing carried out at block 92 thus transforms the normalized image 86 to a filtered structure image 94, $I_{sturct}$ (see FIG. 4), which is further refined by subsequent processing. After the identified structure has been orientation smoothed, the structure regions are then orientation sharpened at step 96 to further refine the filtered structure image 94. The process of orientation sharpening is described more fully below with reference to FIG. 14.

In parallel with the processing of the structure regions described at blocks 92 and 96, the non-structure regions of the normalized image 86 are further processed as well. As depicted at block 98, the image processing circuit 24 performs homogenization smoothing on non-structure regions of the normalized image 86. As described more fully below with reference to FIG. 15, this isotropic smoothing blends features of non-structural regions into the environment surrounding the identified structure to produce a filtered non-structure image 100, $I_{non-struct}$ (see FIG. 4). The filtered non-structure image 100, along with the filtered structure image 94, are the components of the composite filtered image 102, $I_{filtered}$. At block 104 of FIG. 3 the filtered image 102 is renormalized, based upon the post-filtering pixel intensity values and the original normalized intensity range, to produce a renormalized image 106 (see FIG. 4).

At block 108 of FIG. 3, both the structure mask 90 and the renormalized image 106 are expanded by the same factor by which pre-processed image 78 was shrunk at block 80 to produce an expanded structure mask 110 and an expanded image 112 (see FIG. 4), both of which are the same dimensions as pre-processed image 78.

At block 114 of FIG. 3, texture present in the pre-processed image 78 is blended back into the expanded image 112, to produce blended image 116, $I_{blended}$ (see FIG. 4). The blending process of block 114 utilizes the expanded structure mask 110 to allow differential texture blending of structure and non-structure regions. The texture blending process is described below with reference to FIG. 16. An optional, additional blending step occurs at block 118 in which high frequencies are differentially introduced into blended image 116 to produce a noise blended image 120, $I_{noise}$ (see FIG. 4). The addition of high frequencies is accomplished by adding small amounts of intensity-dependent noise from a uniform distribution of random numbers to the blended image 116. The addition of high frequency noise improves the perceived image quality. The noise introduction step also utilizes the expanded structure mask 110 to allow the differential noise blending of structure and non-structure regions. In a typical implementation, the introduced noise is less than five percent (5%) of the intensity of the filtered pixel. Following step 118, the resulting pixel image values are stored in memory circuit 26 for eventual reconstruction, display, or analysis as final image 122.

Structure Identification

Figure 5:
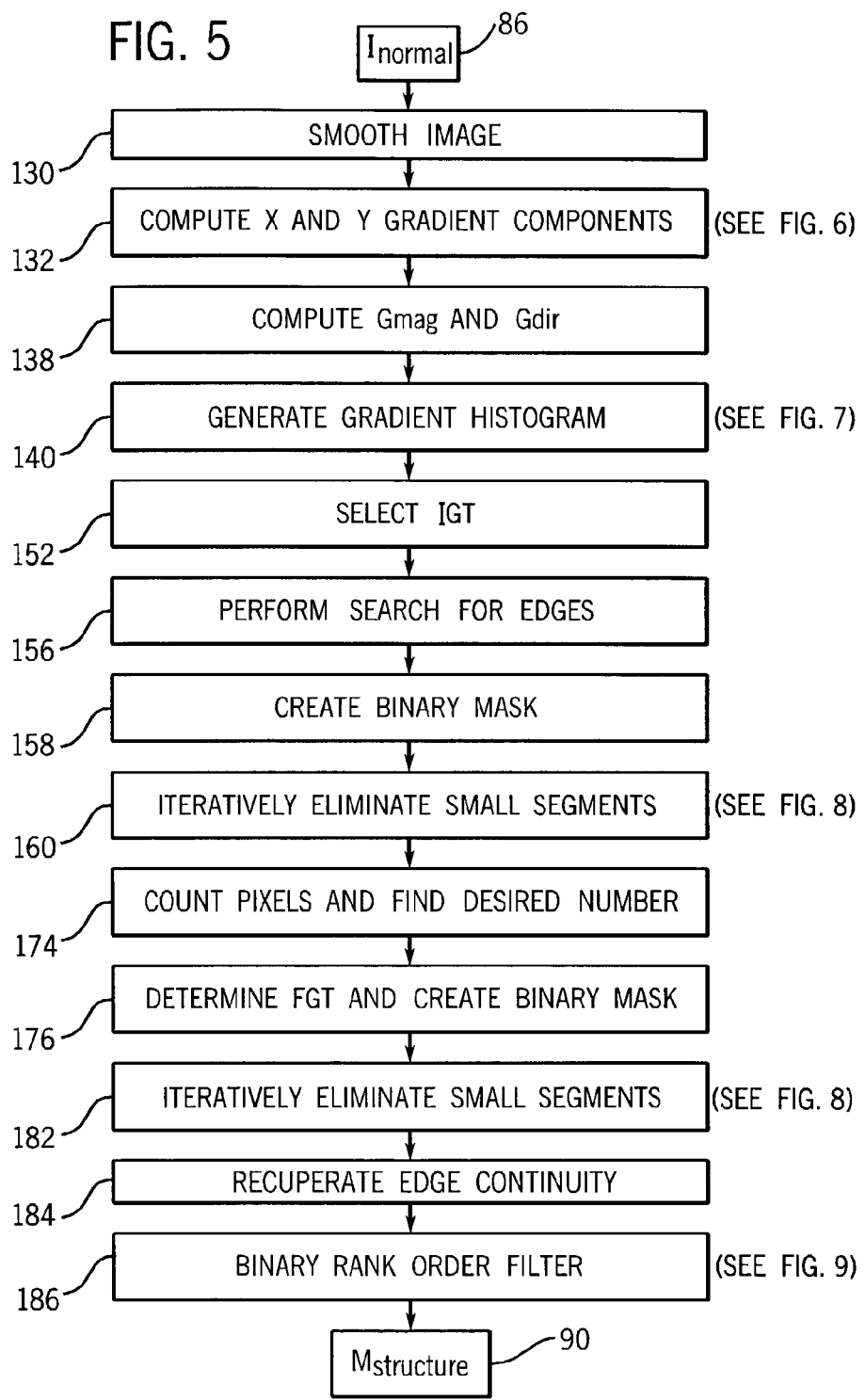
FIG. 5 is a flow chart depicting the steps in identifying structural features in a discrete pixel image.

Turning now to FIG. 5, the control logic process for identifying the structural regions 62 within the normalized image 86 and for eliminating small or noisy isolated regions from the definition of the structural regions is depicted. As indicated above, the logic of FIG. 5, summarized as step 88 in FIG. 3, begins with pixel data of the normalized image 86.

At block 130 a blurred or smoothed version of the normalized image 86 is preferably formed. By beginning the processes depicted by FIG. 5 with this smoothed image, structural components of the image may be rendered more robust and less susceptible to noise. While any suitable smoothing technique may be employed at block 130, in the present embodiment, a box-car smoothing technique is used, wherein a box-car filter smoothes the image by averaging the value of each pixel with values of neighboring pixels. As will be appreciated by those skilled in the art, a computationally efficient method for such filtering may be implemented, such as employing a separable kernel (3 or 5 pixels in length) which is moved horizontally and vertically along the image until each pixel has been processed.

Figure 6:
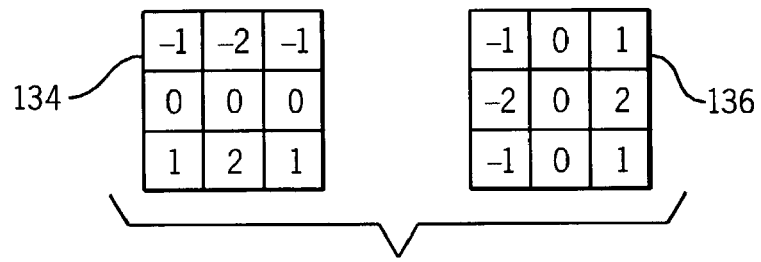
FIG. 6 is a diagram of elements or modules used for computing gradient components to be used in identifying structural features in a discrete pixel image.

At block 132, X and Y gradient components for each pixel are computed based upon the smoothed version of the normalized image 86. While several techniques may be employed for this purpose, in the presently preferred embodiment, 3×3 Sobel modules or operators 134 and 136, depicted in FIG. 6, are employed. As will be appreciated by those skilled in the art, the module 134 is used for identifying the X gradient component, while the module 136 is used for identifying the Y gradient component of each pixel. In this process, the modules 134 and 136 are superimposed over the individual pixel of interest, with the pixel of interest situated at the central position of the 3×3 module. The intensity values located at the element locations within each module are multiplied by the scalar value contained in the corresponding element, and the resulting values are summed to arrive at the corresponding X and Y gradient components.

With these gradient components thus computed, at block 138 the gradient magnitude, $G_{mag}$, and gradient direction, $G_{dir}$, are computed. In the presently preferred technique, the gradient magnitude for each pixel is equal to the higher of the absolute values of the X and Y gradient components for the respective pixel. The gradient direction is determined by finding the arctangent of the Y component divided by the X component. For pixels having an X component equal to zero, the gradient direction is assigned a value of $\pi/2$. The values of the gradient magnitudes and gradient directions for each pixel are saved in the memory circuit 26.

It should be noted that alternative techniques may be employed for identifying the X and Y gradient components and for computing the gradient magnitudes and directions. For example, those skilled in the art will recognize that in place of the Sobel gradient modules 134 and 136, other modules such as the Roberts or Prewitt operators may be employed. Moreover, the gradient magnitude may be assigned in other manners, such as a value equal to the sum of the absolute values of the X and Y gradient components.

Figure 7:
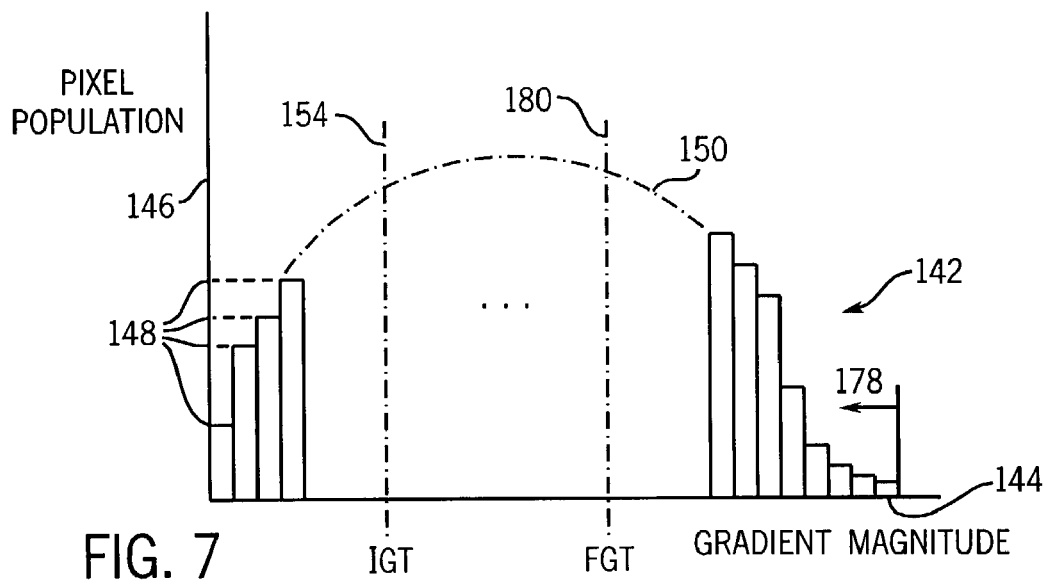
FIG. 7 is a gradient histogram generated from an image used for identifying gradient thresholds for identifying structural features in a discrete pixel image.

Based upon the gradient magnitude values determined at block 138, a gradient histogram is generated as indicated at block 140. FIG. 7 illustrates an exemplary gradient histogram of this type. The histogram, designated by reference numeral 142, is a bar plot of specific populations of pixels having specific gradient values. These gradient values are indicated by positions along a horizontal axis 144, while counts of the pixel populations for each value are indicated along a vertical axis 146, with each count falling at a discrete level 148. The resulting bar graph forms a step-wise gradient distribution curve 150. Those skilled in the art will appreciate that in the actual implementation the histogram of FIG. 7 need not be represented graphically, but may be functionally determined by the image processing circuitry operating in cooperation with values stored in memory circuitry.

The histogram 142 is used to identify a gradient threshold value for separating structural components of the image from non-structural components. The threshold value is set at a desired gradient magnitude level. Pixels having gradient magnitudes at or above the threshold value are considered to meet a first criterion for defining structure in the image, while pixels having gradient magnitudes lower than the threshold value are initially considered non-structure. The threshold value used to separate structure from non-structure is preferably set by an automatic processing or "autofocus" routine as defined below. However, it should be noted that the threshold value may also be set by operator intervention (e.g. via the input device 28) or the automatic value identified through the process described below may be overridden by the operator to provide specific information in the resulting image.

As summarized in FIG. 5, the process for identification of the threshold value begins at block 152 by selecting an initial gradient threshold. This initial gradient threshold, designated 154 in FIG. 7 is conveniently set to a value corresponding to a percentile of the global pixel population, such as 30 percent. The location along the horizontal axis 144 of the IGT value 154 is thus determined by adding pixel population counts from the left-hand edge of the histogram 142 of FIG. 7, adjacent to the vertical axis 146 and moving toward the right (i.e., ascending in gradient values). Once the desired percentile value is reached, the corresponding gradient magnitude is the value assigned to the IGT.

At block 156, a search is performed for edges of the desired structure. The edge search proceeds by locating the pixels having gradient magnitudes greater than the IGT value selected at block 152 and considering a 5×5 pixel neighborhood surrounding the relevant pixels of interest. Within the 5×5 pixel neighborhood of each pixel of interest, pixels having gradient magnitudes above the IGT and having directions which do not differ from the direction of the pixel of interest by more than a predetermined angle are counted. In the presently preferred embodiment, an angle of 0.35 radians is used in this comparison step. If the 5×5 neighborhood count is greater than a preset number, 3 in the present embodiment, the pixel of interest is identified as a relevant edge pixel. At block 158, a binary mask image is created wherein pixels identified as relevant edge pixels at block 156 are assigned a value of 1, while all other pixels are assigned a value equal to zero.

At block 160 small or noisy segments identified as potential candidates for structure are iteratively eliminated. Processes in control logic for eliminating these segments are summarized in FIG. 8. Referring to FIG. 8, the process begins at block 162 where a binary image is obtained by assigning a value of 1 to pixels having a gradient magnitude value equal to or greater than a desired value, and a value of zero to all other pixels. This binary image or mask is substantially identical to that produced at block 158 (see FIG. 5). At block 164 each pixel having a value of 1 in the binary mask is assigned an index number beginning with the upper-left hand corner of the image and proceeding to the lower right. The index numbers are incremented for each pixel having a value of 1 in the mask. At block 166 the mask is analyzed row-by-row beginning in the upper left by comparing the index values of pixels within small neighborhoods. For example, when a pixel is identified having an index number, a four-connected comparison is carried out, wherein the index number of the pixel of interest is compared to index numbers, if any, for pixels immediately above, below, to the left, and to the right of the pixel of interest. The index numbers for each of the connected pixels are then changed to the lowest index number in the connected neighborhood. The search, comparison and reassignment then continues through the entire pixel matrix, resulting in regions of neighboring pixels being assigned common index numbers. In the preferred embodiment the index number merging process of block 166 may be executed several times, as indicated by decision block 168 in FIG. 8. Each subsequent iteration is preferably performed in an opposite direction (i.e., from top-to-bottom, and from bottom-to-top).

Following the iterations accomplished through subsequent search and merger of index numbers, the index number pixel matrix will contain contiguous regions of pixels having common index numbers. As indicated at block 170 in FIG. 8, a histogram is then generated from this index matrix by counting the number of pixels having each index number appearing in the index matrix. As will be apparent to those skilled in the art, each separate contiguous region of pixels having index numbers will have a unique index number. At block 172, regions represented by index numbers having populations lower than a desired threshold are eliminated from the definition of structure as determined at block 158 of FIG. 5. In a presently preferred embodiment, regions having a pixel count lower than 50 pixels are eliminated at block 172. The number of pixels to be eliminated in this step, however, may be selected as a function of the matrix size, and the amount and size of isolated artifacts to be permitted in the definition of structure in the final image.

Returning to FIG. 5, with pixels for small segments eliminated from the binary mask created at block 158, the number of pixels remaining in the binary mask are counted as indicated at block 174. While the resulting number may be used to determine a final gradient threshold, it has been found that a convenient method for determining a final gradient threshold for the definition of structure includes the addition of a desired number of pixels to the resulting pixel count. For example, in a presently preferred embodiment a value of 4,000 is added to the binary mask count resulting from the process of block 174 to arrive at a desired number of pixels in the image structure definition. This parameter may be set as a default value, or may be modified by an operator. In general, a higher additive value produces a sharper image, while a lower additive value produces a smoother image. This parameter, referred to in the present embodiment as the "focus parameter" may thus be varied to redefine the classification of pixels into structures and non-structures.

With the desired number of structure pixels thus identified, a final gradient threshold or FGT is determined as illustrated at block 176 in FIG. 5, based upon the histogram 142 as shown in FIG. 7. In particular, the population counts for each gradient magnitude value beginning from the right-hand edge of the histogram 142 are summed moving to the left as indicated by the reference number 178. Once the desired number of structural pixels is reached (i.e., the number of pixels counted at block 174 plus the focus parameter), the corresponding gradient magnitude value is identified as the final gradient threshold 180. In the presently preferred embodiment, the FGT value is then scaled by multiplication by a value which may be automatically determined or which may be set by a user. For example, a value of 1.9 may be employed for scaling the FGT, depending upon the image characteristics, the type and features of the structure viewable in the image, and so forth. The use of a scalable threshold value also enables the technique to be adapted easily and quickly to various types of images, such as for MR image data generated in systems with different field strengths.

Based upon this scaled final gradient threshold, a new binary mask is defined by assigning pixels having values equal to or greater than the FGT a value of 1, and all other pixels a value of zero. At block 182 the resulting binary mask is filtered to eliminate small, isolated segments in a process identical to that described above with respect to block 160 and FIG. 8. However, at block 182 rather than a four-connected neighborhood, an eight-connected neighborhood (i.e., including pixels having shared edges and corners bounding the pixel of interest) is considered in the index number merger steps.

At block 184, certain of the isolated regions may be recuperated to provide continuity of edges and structures. In the present embodiment, for example, if a pixel in the gradient image is above a second gradient threshold, referred to as GFT, and is connected (i.e. immediately adjacent) to a pixel which is above the FGT, the corresponding pixel in the binary image is changed from a 0 value to a value of 1. The value of the GFT may be set to a desired percentage of the FGT, and may be determined empirically to provide the desired degree of edge and structure continuity. This gradient following step is preferably carried out recursively to determine an initial classification of the pixels.

At block 186 in FIG. 5, the feature edges identified through the previous processes, representative of candidate structures in the image, are binary rank order filtered. While various techniques may be employed for this enhancing identified candidate structures, it has been found that the binary rank order filtering provides satisfactory results in expanding and defining the appropriate width of contiguous features used to define structural elements. Processes in exemplary control logic for implementing the binary rank order filtering of block 186 are illustrated in FIG. 9.

Figure 9:
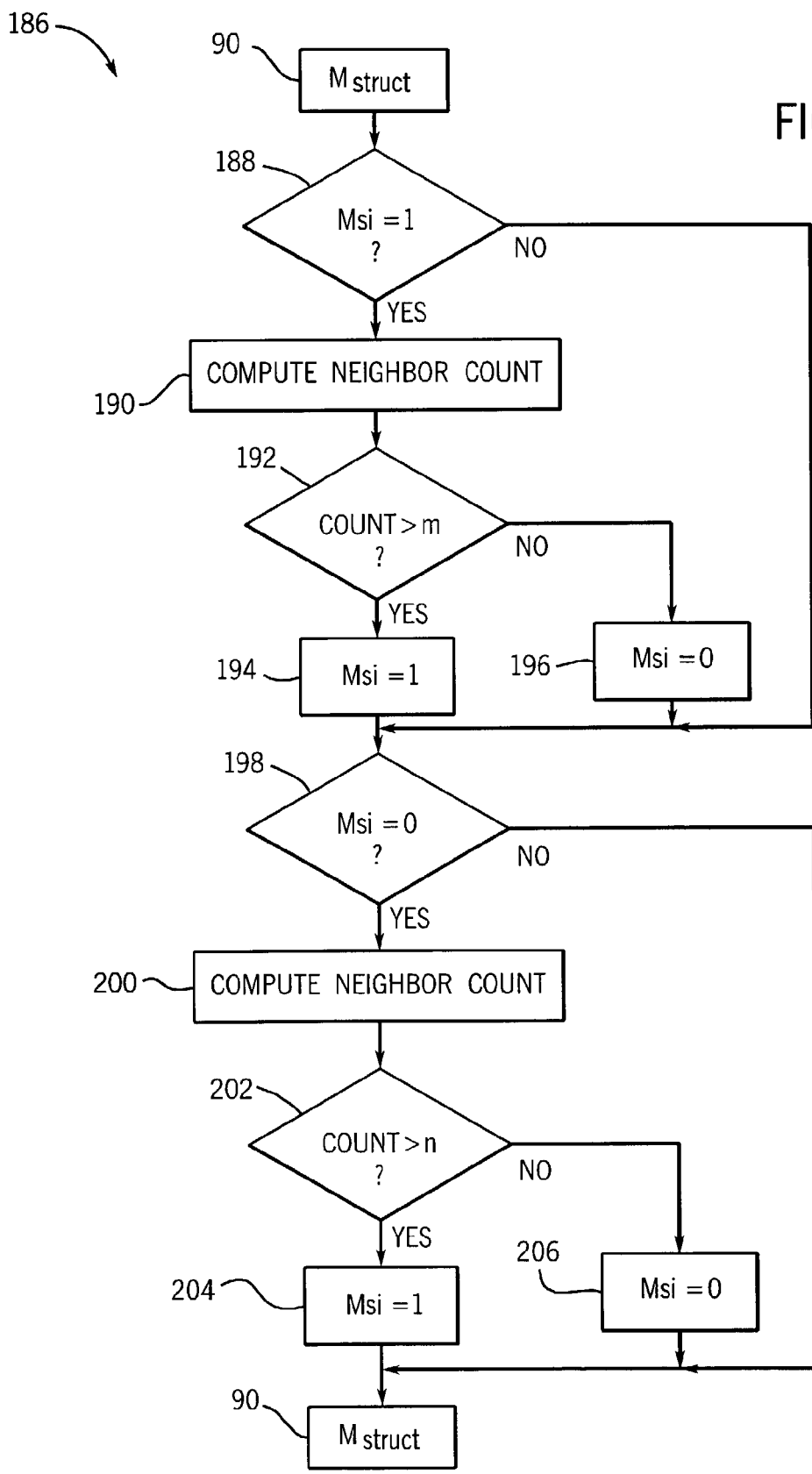
FIG. 9 is a flow chart depicting the steps for processing image pixels using a binary rank order filter to generate a structure mask.

Referring to FIG. 9, the binary rank order filtering begins at decision block 188 with the binary mask generated and refined in the preceding steps. At the decision block 188, the processing circuit 24 determines whether a pixel in the binary mask has a value of 1. If the pixel found to have a value of 1 in the mask, a neighborhood count is performed at block 190. In this neighborhood count, pixels in the binary mask having values of 1 are counted within a 3×3 neighborhood surrounding the structural pixel of interest. This count includes the pixel of interest. At decision block 192, the processing circuit 24 determines whether the count from block 190 exceeds a desired count m. In the present embodiment, the value of m used at block 192 is 2. If the count is found to exceed the value m the value of 1 is reassigned to the pixel of interest, as indicated at block 194. If, however, the count is found not to exceed the value of m the pixel of interest is assigned the value of 0 in the mask as indicated at block 196. Following the processes of blocks 194 and 196, or if the pixel is found not to have an original value of 1 in the mask at block 188, control proceeds to decision block 198.

At decision block 198, the processing circuit 24 reviews the structure mask to determine whether each pixel of interest has a value of 0. If a pixel is located having a value of 0, the processing circuit 24 computes a neighborhood count, as depicted by block 200, similar to that described above with respect to block 190. In particular, a 3×3 neighborhood around the non-structure pixel of interest is examined and a count is determined of pixels in that neighborhood having a mask value of 1. At decision block 202 this neighborhood count is compared to a parameter n. If the count is found to exceed the parameter n, the mask value for the pixel is changed to 1 at block 204. If the value is found not to exceed n, the mask pixel retains its 0 value as indicated at block 206. In the present embodiment, the value of n used at block 202 is 2. Following the refinements of blocks 204 and 206, the structure mask 90 contains information identifying structural features of interest and non-structural regions. Specifically, pixels in structure mask 90 having a value of 1 are considered to identify structure, while pixels having a value of 0 are considered to indicate non-structure.

Structure Processing

Figure 10:
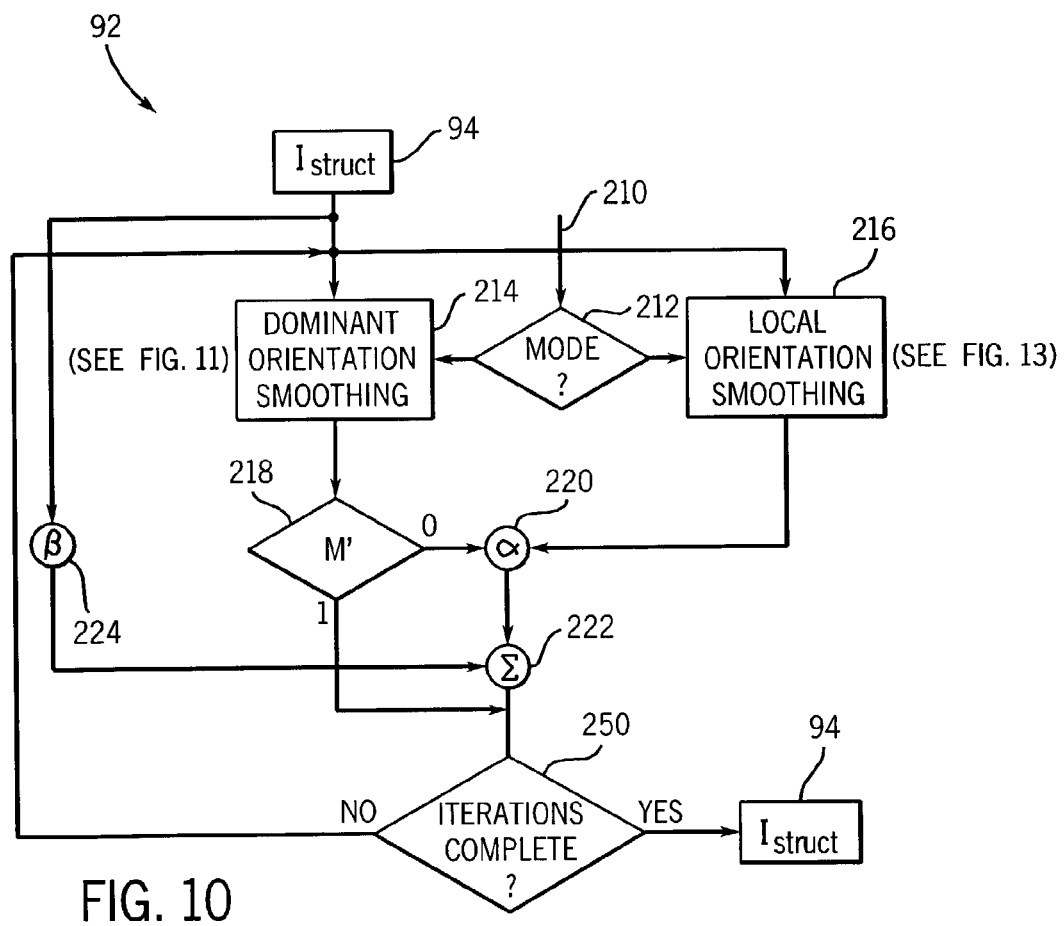
FIG. 10 is a flow chart depicting the steps for performing orientation smoothing of image pixels identified as structure.

With the structure of the image thus identified, orientation smoothing of the structure, as indicated at block 92 of FIG. 3, is carried out through logic such as that illustrated diagrammatically in FIG. 10. As shown in FIG. 10, the orientation smoothing of image structure begins by looking at the structure image 94, $I_{struct}$ as determined via application of the structure mask 90 to the normalized image 86, and may proceed in different manners depending upon the type of smoothing desired. In particular, based upon an operator input designated 210 in FIG. 10, a logical decision block 212 directs the image processing circuit 24 to perform either dominant orientation smoothing as indicated at reference numeral 214 or local orientation smoothing as indicated at 216. If dominant orientation smoothing is selected, the intensity values for the structural pixels are processed as summarized below with respect to FIG. 11, to generate a binary mask M'. Following iterations of the procedure outlined below with reference to FIG. 11, the values of mask M' are evaluated at step 218, and smoothing is performed on the structure intensity values by use of multipliers α and β, resulting in values which are then summed as indicated at blocks 220, 222 and 224 of FIG. 10 and as summarized in greater detail below.

Figure 12:
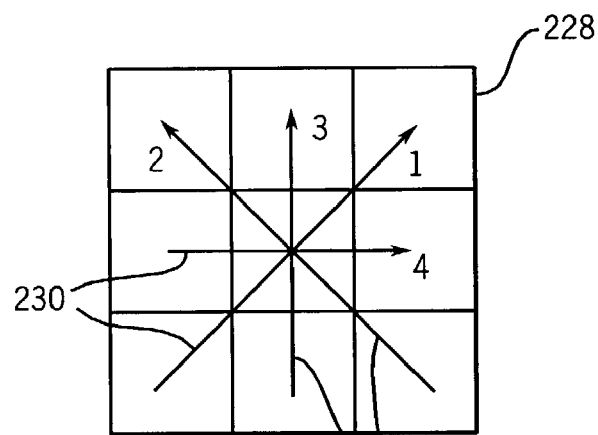
FIG. 12 is a diagram of directional indices employed in the orientation smoothing of image pixels identified as structure.

To explain the dominant orientation smoothing process of block 214, reference is now made to FIG. 11. As illustrated in FIG. 11 at block 226, the dominant orientation smoothing begins with assigning directional indices to each structural pixel of structure image 94. In the present embodiment, one of four directional indices is assigned to each structural pixel in accordance with the statistical variances for each pixel, as shown in FIG. 12. As illustrated in FIG. 12, within a local neighborhood 228 surrounding each structural pixel, statistical variances for pixel kernels in four directions are computed by reference to the normalized intensity values of the surrounding pixels. The direction of the minimum variance is selected from the four computed values and a corresponding directional index is assigned as indicated by reference numeral 230 in FIG. 12. In the present embodiment these directional indices are assigned as follows: "1" for 45 degrees; "2" for 135 degrees; "3" for 90 degrees; and "4" for 0 degrees. These processes are summarized as blocks 232 and 234 in FIG. 11. At block 236 a local area threshold value is assigned based upon the image matrix size. In the present embodiment, a local area threshold of 6 is used for 256×256 pixel images, a value of 14.25 is used for 512×512 pixel images, and a value of 23 is used for 1024×1024 pixel images.

At block 238, a binary mask M' is initialized with zero values for each pixel. At block 240 a dominant orientation is established for each structural pixel by examining the directional indices set at block 234 within a local neighborhood surrounding each structural pixel. In this process, the directional indices found in the local neighborhood are counted and the pixel of interest is assigned the directional index obtaining the greatest count (or the lowest index located in the case of equal counts).

In the present embodiment, both the dominant direction and its orthogonal direction are considered to make a consistency decision in the dominant orientation smoothing operation. In terms of FIG. 12, these directions are 1 and 2, or 3 and 4. It has been found that considering such factors substantially improves the robustness of the dominant orientation determination in the sense of being consistent with the human visual system (i.e. providing reconstructed images which are intuitively satisfactory for the viewer).

The consistency decision made at block 240 may be based upon a number of criteria. In the present embodiment, the image is smoothed along the dominant direction (i.e. the direction obtaining the greatest number of counts in the neighborhood) if any one of the following criteria is met: (1) the number of counts of the orientation obtaining the greatest number is greater than a percentage (e.g. 67%) of the total neighborhood counts, and the orthogonal orientation obtains the least counts; (2) the number of counts of the orientation obtaining the maximum counts is greater than a smaller percentage than in criterion (1) (e.g. 44%) of the total neighborhood counts, and the orthogonal direction obtains the minimum number, and the ratio of the counts of the dominant direction and its orthogonal is greater than a specified scalar (e.g. 5); or (3) the ratio of the dominant direction counts to its orthogonal direction counts is greater than a desired scalar multiple (e.g. 10).

In the present embodiment, the neighborhood size used to identify the direction of dominant orientation block 240 is different for the series of image matrix dimensions considered. In particular, a 3×3 neighborhood is used for 256×256 pixel images, a 5×5 neighborhood is used for 512×512 pixel images, and a 9×9 neighborhood is used for 1024×1024 pixel images.

At decision block 242, the count determined in the searched neighborhood for each pixel is compared to the local area threshold. If the count is found to exceed the local area threshold, the image processing circuit 24 performs the processes of block 244. The processes of block 244 set the intensity value for the structural pixel equal to the average intensity of a 1×3 kernel of pixels in the dominant direction for the pixel of interest. Subsequently, at block 246, the value of a corresponding location in the binary matrix M' is changed from 0 to 1. If at block 242, the count is found not to exceed the local area threshold for a particular pixel, the intensity value for the pixel of interest is set equal to a weighted average as indicated at block 248. This weighted average is determined by the relationship:

weighted avg=(1/1+p)(input)+(p/1+p)(smoothed value);

where the input value is the value for the pixel of interest at the beginning of routine 214, p is a weighting factor between 1 and 200, and the smoothed value is the average intensity of a 1×3 kernel in the dominant direction of the pixel of interest. From either block 246 or 248, the processing circuit 24 returns to perform the functions of block 218 of FIG. 10.

Referring again to FIG. 10, at block 218, the values of each pixel in the binary mask M' are evaluated. If the value is found to equal zero, the corresponding intensity value is multiplied by a weighting factor α at block 220. In the present embodiment, factor α is set equal to 0.45. At block 222 the resulting value is summed with the product of the normalized intensity value for the corresponding pixel and a weighting factor β as computed at block 224. In the present embodiment, the factors α and β have a sum equal to unity, resulting in a value of β equal to 0.55.

If at block 218 the value for a particular pixel is found to equal 1 in the binary mask M', control advances to decision block 250. the decision block 250 is also reached following the summation performed at block 222 as described above. In the present embodiment, the foregoing dominant orientation smoothing steps are performed over a desired number of iterations to provide sufficient smoothing and bridging between structural regions. At block 250, therefore, the processing circuit 24 determines whether the desired number of iterations have been completed, and if not, returns to block 214 to further smooth the structural regions. In the present embodiment, the operator may select from 1 to 10 such iterations.

Figure 13:
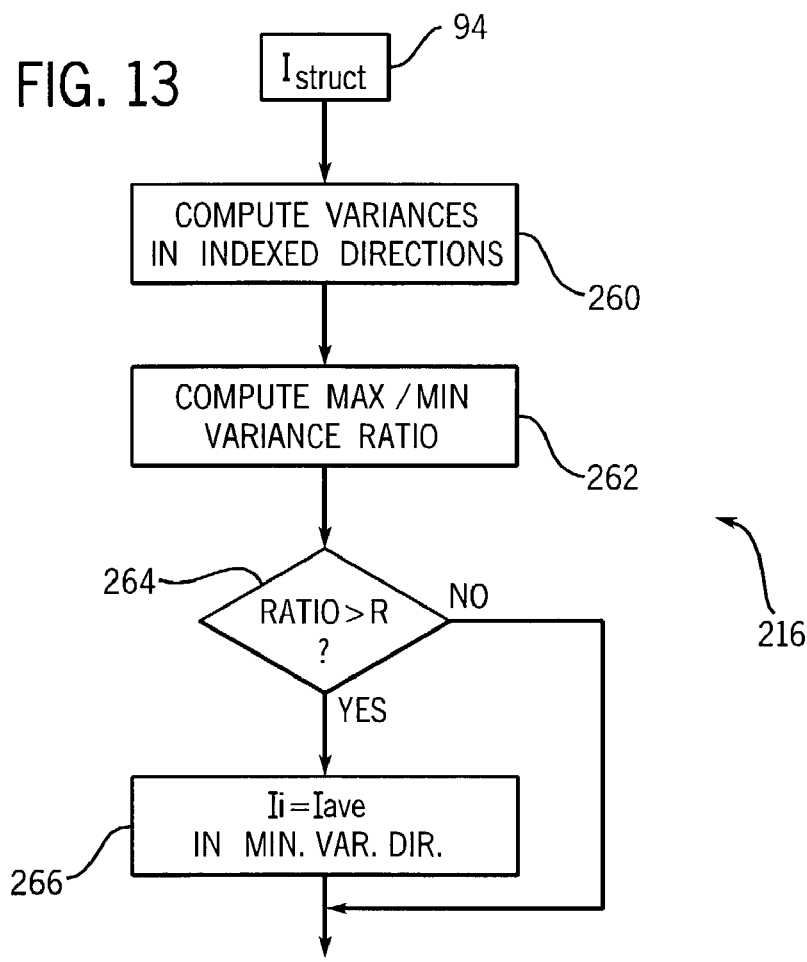
FIG. 13 is a flow chart depicting the steps for performing local orientation smoothing of image pixels identified as structure.

As noted above, the orientation smoothing can proceed through an alternative sequence of steps for local orientation smoothing as noted at block 216 in FIG. 10. FIG. 13 illustrates exemplary steps in control logic for such local orientation smoothing. As with the dominant orientation smoothing, the local orientation smoothing begins with the normalized intensity values for the structural pixels as provided by the structure image 94. At block 260, statistical variances for 1×3 pixel kernels about each structural pixel are calculated for each indexed direction (see FIG. 12) as described above for the dominant orientation smoothing process. At block 262, a ratio of the maximum/minimum statistical variances identified for each pixel in block 260 is computed. At decision block 264 this ratio for each structural pixel is compared to a parameter R, referred to as a relaxation factor for the local orientation filtering. In the present embodiment, the value of R can be set between 1 and 200. If at block 264 the variance ratio is found to exceed R, local orientation filtering is accomplished as indicated at block 266 by setting the intensity value for the structural pixel of interest equal to an average value for the 1×3 pixel kernel in the direction of the minimum variance. If at block 264 the ratio between the maximum and minimum variances for the pixel of interest is found not to exceed R, no local orientation smoothing is performed and the processing circuit 24 advances to a point beyond the processes of block 266. From this point, control returns to block 220 of FIG. 10.

As illustrated in FIG. 10, at block 220 the intensity value for each structural pixel is multiplied by a weighting factor α, and combined at block 222 with the product of the normalized intensity value for the corresponding pixel and a weighting factor β produced at block 224. As summarized above, at decision block 250, the processing circuit 24 determines whether the desired number of iterations has been completed and, if not, returns to the local orientation smoothing block 216, to repeat the steps of FIG. 13 until the desired number of iterations is complete. Once the desired iterations have been performed, the filtered structure image 94 resulting from the orientation smoothing is further filtered by the processes described below.

Figure 14:
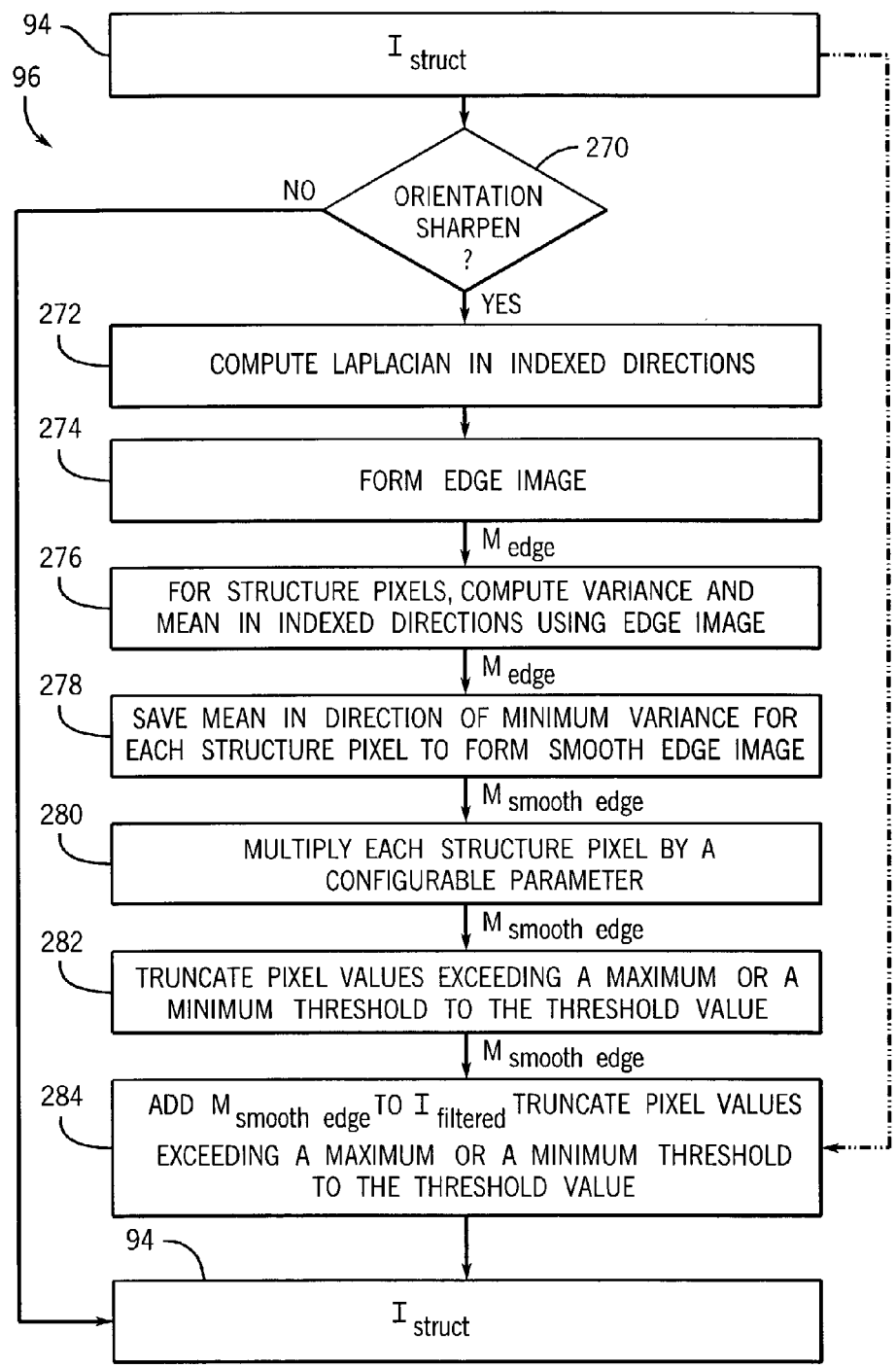
FIG. 14 is a flow chart depicting the steps for performing orientation sharpening of image pixels identified as structure.

The filtered structure image 94 is further processed by orientation sharpening of the identified structure pixels, as illustrated in greater detail in FIG. 14. As shown in FIG. 14, in the present embodiment, the sharpening is performed only for pixels with intensity values above a preset lower limit, as indicted at decision block 270. This limit, which may be set to a multiple of the FGT (e.g. 2×FGT), thus avoids enhancement of structural pixels which should not be sharpened. If a structural pixel has a value above the limit, the orientation sharpening sequence begins at block 272 where Laplacian values for each such structural pixel are computed in the indexed directions shown in FIG. 12 and described above. The Laplacian values may be computed from the formula:

$$E(k)=2.0*I(k)-I(k-1)-I(k+1);$$

where the index k refers to the current pixel of interest along a given direction, "k−1" is the pixel preceding the pixel of interest in the indexed direction, and "k+1" is the pixel succeeding the pixel of interest in the indexed direction. E(k) is the edge strength and I(k) is the intensity value at the structural pixel of interest. It should be noted that the Laplacian values computed at block 272 are based upon the smoothed structure values. At block 274, the maximum of the four Laplacian values for each structural pixel is then saved to form an edge mask, $M_{edge}$. In forming $M_{edge}$ border pixels in a given image are set to 0 for the subsequent steps.

At block 276, for each structural pixel of $M_{edge}$, the statistical variances and mean values for a 3×1 pixel kernel are computed in the indexed directions shown in FIG. 12, again using the filtered (i.e., homogenized and smoothed) values for each pixel in the relevant neighborhoods. The direction of minimum variance for each structural pixel is then identified from these values, and the mean value in the direction of minimum variance is saved for each pixel as indicated at block 278 to form a smoothed edge mask, $M_{smooth\ edge}$. At block 280, the mean value in the direction of minimum variance for each structural pixel of $M_{smooth\ edge}$ is multiplied by a configurable parameter. In the present embodiment, the value of the configurable parameter may be set to any number greater than 0 depending on the application. In general, the higher the value of the configurable parameter selected, the greater the overall sharpness of strong edges in the final image.

At block 282, each pixel, after multiplication, is compared to both a minimum and a maximum threshold value. Pixels which exceed the maximum threshold value are set equal to the maximum threshold value. Likewise, pixels which are less than the minimum threshold value are set equal to the minimum threshold value. At block 284, the resulting weighted values, represented in $M_{smooth\ edge}$, are added to the initial filtered values for the corresponding structural pixel to form a sharpened structure image 94. If the resulting intensity for the structural pixel is less than 0, its intensity is set to 0. In the present preferred embodiment, if the resulting intensity for the structural pixel exceeds 4,095, its intensity is set to 4,095. This upper limit is configurable to any number greater than 0. The effect of the aforementioned operations is to more strongly enhance weaker edges while providing a more limited enhancement to edges which are already strong.

Non-Structure Processing

Figure 15:
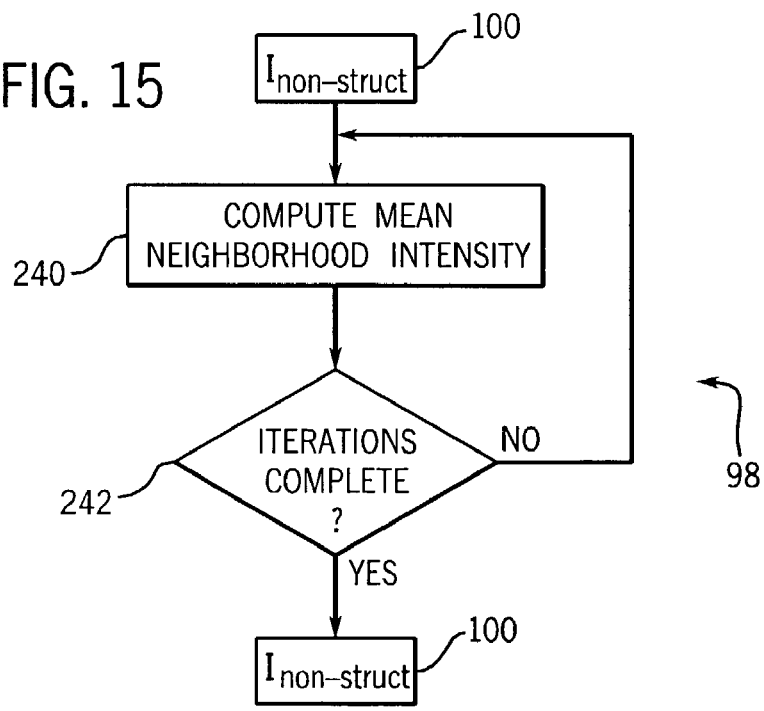
FIG. 15 is a flow chart depicting the steps for performing homogenization smoothing of image pixels identified as non-structure.

As summarized above with reference to FIG. 3, homogenization smoothing of the identified non-structure elements is performed in parallel with orientation smoothing and sharpening of the identified structure elements of the normalized image 86. The process of homogenization smoothing is summarized in FIG. 15. As shown in FIG. 15, the normalized intensity values for non-structural pixels, as represented in the non-structure image 100, $I_{non-struct}$, are considered in this process. At block 290, the mean neighborhood intensity value for each non-structural pixel is computed (taking into account the normalized values of structural pixels where these are included in the neighborhood considered). In the present embodiment, the process of block 290 proceeds on the basis of a 3×3 neighborhood surrounding each non-structural pixel. This mean value is assigned to the pixel of interest and control advances to the decision block 292. At decision block 292, the processing circuit 24 determines whether a desired number of iterations has been completed. If not, control returns to the process of block 290 for further homogenization of the non-structural pixel intensity values. Once the desired number of iterations has been completed the isotropic smoothing routine of FIG. 15 is exited. In the present embodiment, the operator may set the number of homogenization smoothing iterations from a range of 1 to 10. The parallel processing of normalized structure and non-structure elements yields filtered image 102, $I_{filtered}$.

Following orientation sharpening of the structural features of the image and homogenization smoothing of non-structure regions, the entire image is again renormalized as indicated at step 104 in FIG. 3. While various methods may be used for this renormalization, in the present embodiment the global average pixel intensity in filtered image 102 is computed, and a normalization factor is determined based upon the difference between this average value and the average value prior to the filtration steps described above, i.e. at the normalization process of block 84. The new normalized intensity value for each pixel is then determined by multiplying this normalization factor by the filtered pixel intensity, and adding the global minimum intensity value from the original data to the product.

The resulting renormalized image 106, $I_{renormal}$ is then expanded by the same factor, X, by which the pre-processed image 78 was shrunk. The structure mask 90 is also expanded by this same factor. Various suitable interpolation techniques may be used to accomplish this expansion, including cubic interpolation. The products of the expansion process of block 108 are an expanded structure mask 110, $M_{expanded}$, and an expanded image 112, $I_{expanded}$, each with the same dimensions as preprocessed image 78.

The expanded image 112 is processed to blend texture from the preprocessed image 78 into the expanded image 112 via the expanded structure mask 110, as can be seen in FIG. 3 at block 114. This texture blending step is summarized in FIG. 16. The expanded structure mask 110 allows texture to be differentially blended with pixels from the expanded image 112 depending upon whether a pixel is classified as structure or non-structure.

Figure 16:
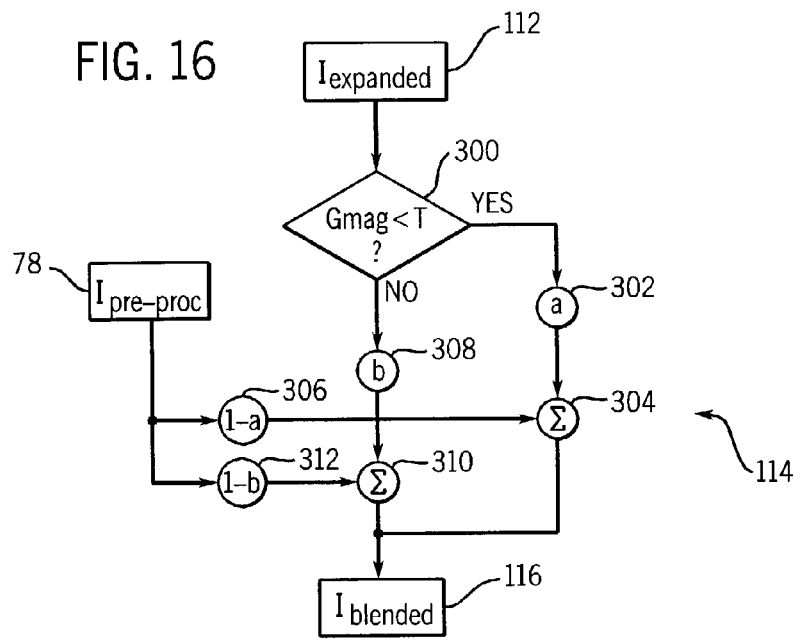
FIG. 16 is a flow chart depicting the steps for introducing weighted textural features from the raw image to the filtered image.

In general, the processes of FIG. 16 tend to add more or less original texture depending upon the gradient magnitude of the pixels. In particular, at decision block 300, the gradient magnitude for each pixel of interest is compared to a threshold value T. In the present embodiment, this threshold is set to a value of 300. If the gradient is found not to exceed the threshold, the pixel intensity value is multiplied by a value "a" at block 302. The resulting product is added at block 304 to the product of the raw intensity value for the pixel (prior to the shrinking at block 80 of FIG. 3) multiplied by a value equal to "1-a" at block 306. The resulting weighted average is assigned to the pixel.

If at block 300, the gradient magnitude value for a pixel is found to exceed the threshold value T, the pixel intensity is multiplied by a factor "b", as noted at block 308. The resulting product is then added at block 310 to the product of the raw intensity for that pixel and a multiplier equal to "1-b" determined at block 312. In the present embodiment, the value of "b" may be set within a range from 0 to 1, with the value of "a" being set equal to 1.5 times the value of "b". As will be apparent to those skilled in the art, the weighted averaging performed by the steps summarized in FIG. 16 effectively adds texture to provide an understandable environment for the structures identified as described above. By performing the comparison at block 300, the process effectively adds less original texture for pixels having low gradient values, and more original texture for pixels having higher gradient values. Where desired, the values of "a" and "b" may be set so as to increase or decrease this function of the process. The product of the differential textural blending of process 114 is blended image 116, $I_{blended}$ which may be displayed, stored in memory, or further processes and analyzed.

Figure 17:
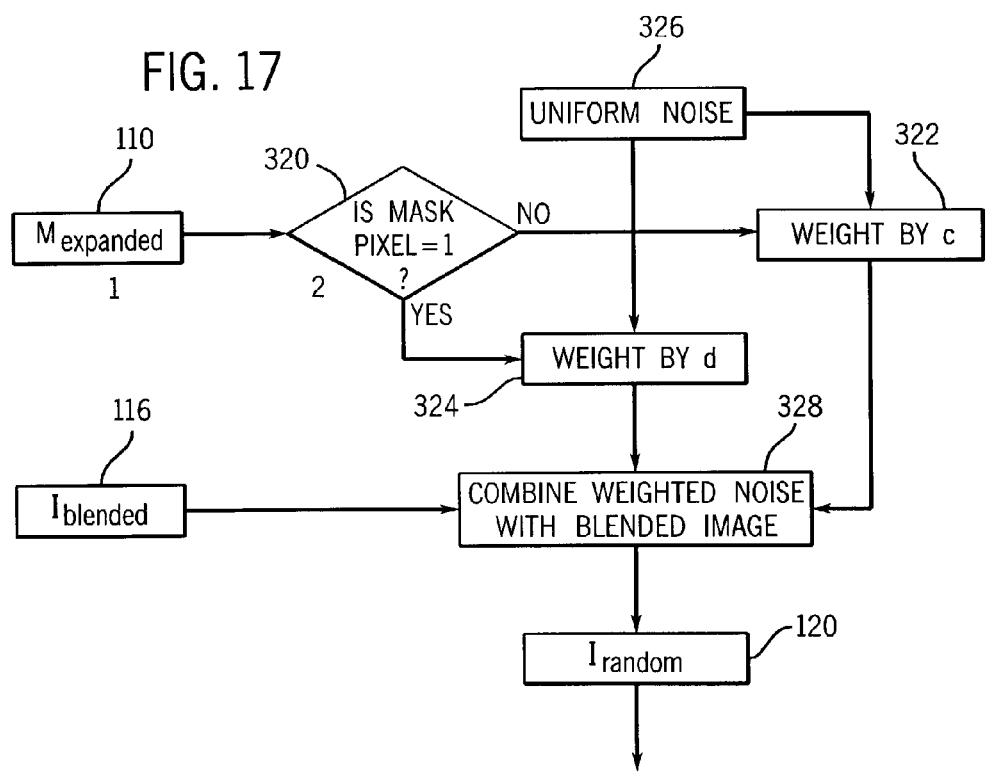
FIG. 17 is a flow chart depicting the steps for introducing weighted random noise to the blended image.

For example, blended image 116 may, optionally, be further processed to add high frequency noise to enhance the perceived quality of the image. This optional processing is depicted at block 118 of FIG. 3 and is elaborated upon in FIG. 17. In FIG. 17, a decision block 320 is first processed to determine whether a given pixel is classified as structure or non-structure, using expanded mask 110. Non-structure and structure pixels are weighted differently, shown respectively as blocks 322 and 324, so that, for each pixel, a random number drawn from a uniform distribution 326 is appropriately weighted and combined with the pixel value at block 328. In this manner, the application of noise to the image is intensity dependent. For example, if a pixel is determined to be structure at decision block 320, the pixel value is combined, at block 328, with a random number drawn from uniform distribution 326 weighted by factor d at block 324. The uniform distribution 326 may be selectively filtered to favor high frequencies, which improve the perceived image quality. In the preferred embodiment, the preferred amount of noise is less than five percent (5%) of the intensity of the filtered pixel. The product of the processes of block 118 is noise blended image 120. The noise blended image 120 may be displayed, stored in memory, or further processed and analyzed to form a final image 122.

While the preceding discussion is directed to an embodiment of the present invention adapted to magnetic resonance imaging, the invention itself may be applied to the processing of any digital image. For example, an alternative embodiment of the invention, with a simple substitution of the imaging system 12 and image acquisition circuitry 22, may be employed for use with a CT medical imaging system. It is therefore easily discernible that the invention itself is generally applicable to the processing of digital images in general and not to magnetic resonance images in particular. While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method for processing a digital image, the method comprising the steps of:
 a processor automatically setting a shrink factor based upon an operator selected field of view;
 shrinking the image by the shrink factor;
 processing the shrunken image to selectively enhance one or more selected regions, wherein processing of selected regions comprises orientation smoothing selected pixels each in only one selected direction of a plurality of possible directions;
 expanding the shrunken and processed image by the shrink factor; and
 blending one or more portions of the expanded image with one or more corresponding portions of the image.

2. The method of claim 1, further comprising the step of blending a distribution of high frequency noise with the image.

3. The method of claim 2, wherein the distribution of high frequency noise is derived from a uniform distribution of random numbers.

4. The method of claim 2, wherein the blending of the distribution of high frequency noise is performed differentially with regard to the one or more selected regions.

5. The method of claim 1, wherein the step of shrinking is accomplished by a sub-sampling technique.

6. The method of claim 1, wherein the step of shrinking is accomplished by use of a boxcar filter.

7. The method of claim 1, wherein the one or more selected regions represent one or more structure regions.

8. The method of claim 1, wherein the one or more selected regions are selected using one or more gradient thresholds.

9. The method of claim 1, further comprising pre-processing the image prior to shrinking such that the one or more edges of the image are padded to facilitate shrinking.

10. The method of claim 1, wherein the processing of selected regions comprises selectively applying directional sharpening of pixels in the selected region.

11. The method of claim 1, wherein expanding the image is accomplished using an interpolation technique.

12. The method of claim 1, wherein the blending of one or more selected regions with the one or more corresponding regions is differential such that different selected regions may be blended in different proportions.

13. A method for processing a digital image, the method comprising the steps of:
 a processor automatically specifying a shrink factor based upon a field of view selected by an operator;
 shrinking the image by the shrink factor;
 processing the shrunken image, wherein processing the image comprises orientation smoothing selected pixels each in only one selected direction of a plurality of possible direction;
 expanding the shrunken and processed image by the shrink factor; and
 blending one or more portions of the expanded image with one or more corresponding portions of the image.

14. The method of claim 13, wherein the shrink factor is set to 1 for images sized less than or equal to 256×256, 2 for images sized greater than 256×256 but less than or equal to 512×512, and 4 for all images sized greater than 512×512.

15. The method of claim 13, further comprising blending the image with a distribution of high frequency noise.

16. The method of claim 15, wherein the distribution of high frequency noise is uniformly distributed.

17. The method of claim 15, wherein blending is performed differentially such that one or more selected regions of the image are blended with noise at a different proportion than the remainder of the image.

18. The method of claim 15, wherein the amount of high frequency noise blended with a pixel is less than five percent of the intensity of the pixel.

19. The method of claim 13, wherein shrinking is accomplished by use of a boxcar filter.

20. The method of claim 13, wherein processing comprises enhancing one or more selected regions of the image relative to the non-selected regions.

21. The method of claim 20, wherein the one or more selected regions represent structural elements of the image.

22. The method of claim 13, wherein expanding is accomplished using an interpolation technique.

23. The method of claim 13, further comprising padding the image prior to shrinking to facilitate the shrinking process.

24. A system for processing a digital image, the system comprising:
 an input device for controlling image acquisition and processing;
 an output device for producing a reconstructed image based upon processed image data; and
 a signal processing circuit configured to provide processed image data wherein the signal processing circuit receives a selected field of view from an operator via the input device, assigns a shrink factor in response to the selected field of view, shrinks the image by the shrink factor, processes the shrunken image, wherein processes the image comprises orientation smoothing selected pixels each in only one selected direction of a plurality of possible direction; expands the shrunken and processed image by the shrink factor, and blends one or more portions of the expanded image with one or more corresponding portions of the image.

25. The system of claim 24, wherein the signal processing circuit pads the image prior to shrinking the image to facilitate the shrinking process.

26. The system of claim 24, wherein the signal processing circuit processes the image by identifying one or more structural elements within the image and differentially enhancing the one or more structural elements.

27. The system of claim 24, wherein the signal processing circuit blends the image with a distribution of noise.

28. The system of claim 27, wherein the distribution is uniform.

29. The system of claim 28, wherein the distribution is filtered to substantially comprise high-frequency noise.

30. The system of claim 27, wherein the signal processing circuit blends the image and the distribution of noise differentially such that one or more regions of the image receive a greater proportion of noise.

* * * * *

UNITED STATES PATENT AND TRADEMARK OFFICE
CERTIFICATE OF CORRECTION

| | |
|---|---|
| PATENT NO. | : 7,599,579 B2 |
| APPLICATION NO. | : 10/193564 |
| DATED | : October 6, 2009 |
| INVENTOR(S) | : Gopal B. Avinash |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1159 days.

Signed and Sealed this

Twenty-eighth Day of September, 2010

David J. Kappos
*Director of the United States Patent and Trademark Office*